United States Patent [19]
Khosravi-Sichani et al.

[11] Patent Number: 5,983,217
[45] Date of Patent: Nov. 9, 1999

[54] APPARATUS AND METHOD FOR QUERYING REPLICATED DATABASES

[75] Inventors: Bahman Khosravi-Sichani, Morganville; Donald Jay Mintz, Fair Haven; Mark A. Ratcliffe, Oakhurst, all of N.J.

[73] Assignee: AT&T Corp, New York, N.Y.

[21] Appl. No.: 08/821,505

[22] Filed: Mar. 21, 1997

[51] Int. Cl.⁶ .................................................. G06F 17/00
[52] U.S. Cl. .............................. 707/3; 707/10; 707/102
[58] Field of Search ................ 707/1–206; 370/254–258

[56] References Cited

U.S. PATENT DOCUMENTS

| | | | |
|---|---|---|---|
| 5,283,897 | 2/1994 | Georgiadis et al. | 395/650 |
| 5,402,350 | 3/1995 | Kline | 364/468 |
| 5,408,612 | 4/1995 | Shirron et al. | 395/275 |
| 5,506,987 | 4/1996 | Abramson et al. | 395/650 |

*Primary Examiner*—Wayne Amsbury
*Assistant Examiner*—David Kink Jung

[57] ABSTRACT

The apparatus and method of the present invention provides even loadsharing of round-robin querying of replicated databases in a network architecture which responds to network conditions. The network architecture utilizes a round-robin routing table that includes correlated index numbers, point codes and addresses of the replicated databases. The network architecture responds to incoming queries with searching of the round-robin routing table by incrementing to a successor index number and an associated point code. The network architecture may further determine whether the database at the address pointed by the point code is accessible. If not, the network architecture increments to another successor index number to locate an accessible database. When an accessible database is found, the point code is set to the address of the accessible database and the query is forwarded to that address.

16 Claims, 5 Drawing Sheets

| INDEX | POINT CODE | SUBSYSTEM NUMBER |
|---|---|---|
| 0 | 254-002-002 | 253 |
| 1 | 254-003-002 | 253 |
| ... | ... | ... |
| N-1 | 254-007-002 | 253 |

APPARATUS AND METHOD FOR QUERYING REPLICATED DATABASES

BACKGROUND OF THE INVENTION

This invention relates to replicated database network architecture. More particularly, the invention relates to providing even loadsharing of queries among the replicated databases in the network.

In the early 1980's, centralized databases called network control points (NCP) were introduced into signaling networks by AT&T to support the credit card calling service and 800 service. The network architecture with these network control points allowed intelligent network services for providing call handling information in response to network queries.

The network control points for the 800 service, for example, are deployed throughout the United States to support the Data Base 800 Service mandated by the Federal Communication Commission. In the network architecture for such 800 service, 800 number calls are routed from a local router or end office to a network switch which launches network queries to the Network Control Point. The network control point translates the 800 number to a routing number and returns the routing number to the network switch. The network switch subsequently routes the call to an appropriate network carrier based on this routing number.

The network control points are designed to accommodate growth and additional services. For example, the network control points are designed as high-capacity systems handling more than one million queries per hour. Also, alternate billing services (ABS) such as a collect calling service and a bill-to-third number calling service have been implemented using the network control point architecture. The network control points comprise replicated databases containing the same records for reliability reasons against natural disasters such as fire and flood.

With an increasing number of communication services introduced into the network and increasingly sophisticated services, developing a scheme to insure that queries are handled evenly among available network control points is an important task. For example, where the control points comprising a set of replicated databases in the telecommunication network receive a large volume of queries that can be handled at any of the replicated databases, it is essential to direct incoming queries only to available databases.

It is therefore an object of this invention to provide reliable methods and networks that can handle a large volume of queries to the distributed applications.

It is a more particular object of this invention to provide methods and networks that can evenly loadshare queries amongst available databases containing the same software and data.

SUMMARY OF THE INVENTION

These and other objects of the invention are accomplished in accordance with the principles of the invention by providing an even loadsharing of queries in a network architecture with replicated databases with ability to respond to its network conditions. The network includes a round-robin routing table having correlated index numbers, point codes and addresses of the replicated databases. The network architecture responds to incoming queries with searching of the round-robin routing table by incrementing to a successor index number. For example, a switch in a communication network may respond to incoming queries with searching of the round-robin routing table. Alternatively, a transfer node in a telecommunication network designed for routing messages between switches and databases may respond to incoming queries with searching of the round-robin routing table. The searching of the round-robin routing table provides an available address of the database where the query is directed.

Further features of the invention, its nature and various advantages will be more apparent from the accompanying drawings and the following detailed description of the preferred embodiments.

DETAILED DESCRIPTION OF THE PREFERRED EMBODIMENTS

Figures 1, 3:
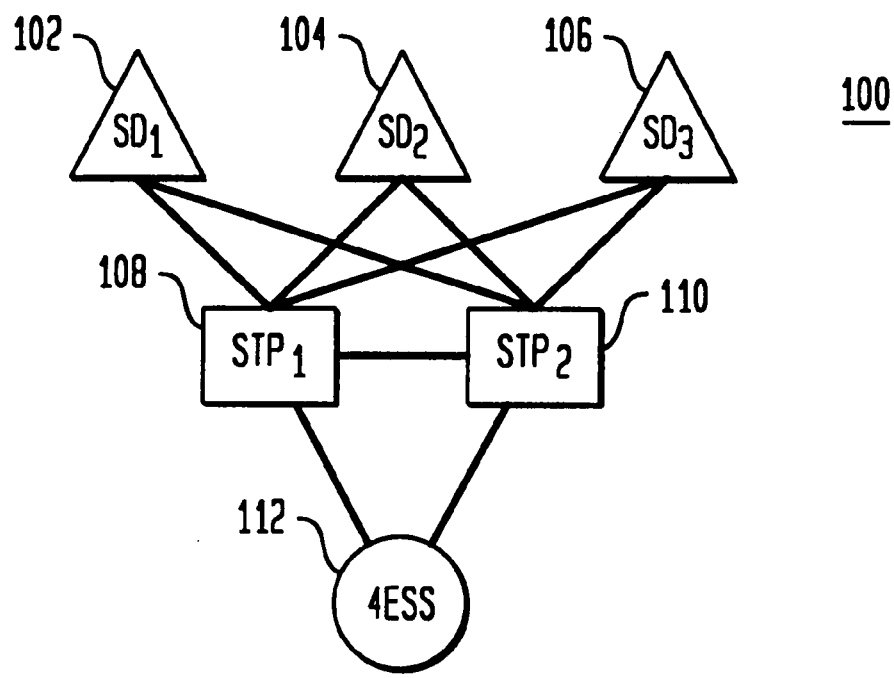
FIG. 1 is a simplified block diagram of illustrative network which can be operated in accordance with this invention.
FIG. 3 is an illustrative round-robin routing table which can be utilized in accordance with this invention.

In the illustrative embodiment shown in FIG. 1 a representative communication network architecture for querying replicated commercial databases is shown. As used in this application, a Segmentation Directory ("SD") refers to an exemplary network control point or replicated database added to a conventional telecommunication network. The SDs generally contain the same software and customer data and are used to locate service processors or network application processors which perform intelligent network services based on dialed numbers. A Signal Transfer Point ("STP") refers to a high-capacity packet switch for routing signaling messages between switches and databases such as SDs. Lucent 4ESS® ("4ESS") is a representative switch in a telecommunication network.

The illustrative Communication Network 100 of the present invention includes a set of SDs, STPs and 4ESS which are interconnected via Signaling System 7 ("SS7") links that normally function at 56 kb/s in North America and at 64 kb/s in Europe. It is not a requirement that the SDs are all interconnected to the STPs, but is shown here for simplicity. For example, $SD_1$ 102 could be connected only to $STP_1$ 108 while $SD_2$ 104 is connected only to $STP_2$ 110. Since each of SDs perform the same application and contain an identical copy of customer data, 4ESS switch 112 can send a query to any of SDs which can correctly process the query and respond to the query.

The preferred embodiment of the present invention provides 4ESS switch 112 to implement a round-robin algorithm to evenly loadshare incoming queries among the replicated $SD_1$ 102, $SD_2$ 104 and $SD_3$ 106. Thus, 4ESS switch 112 would send the query for the first call received to $SD_1$ 102. The next call would result in a query to $SD_2$ 104, and the following call would result in a query to $SD_3$ 106. 4ESS switch 112 in performing the round-robin algorithm accounts various factors such as the SD's SS7 route accessibility, SD's SS7 route congestion status and SD application availability as described in greater detail hereinbelow.

Alternative embodiment of the present invention allows the round-robin algorithm to be executed at the mated pair of STP$_1$ 108 and STP$_2$ 110 in order to alleviate the processing burden on 4ESS switch 112. The implemented algorithm for STP$_1$ 108 and STP$_2$ 110 is almost identical to the algorithm implemented in the 4ESS switch (112 described above. The distinction is described in reference to FIGS. 4 and 5.

Figure 2:
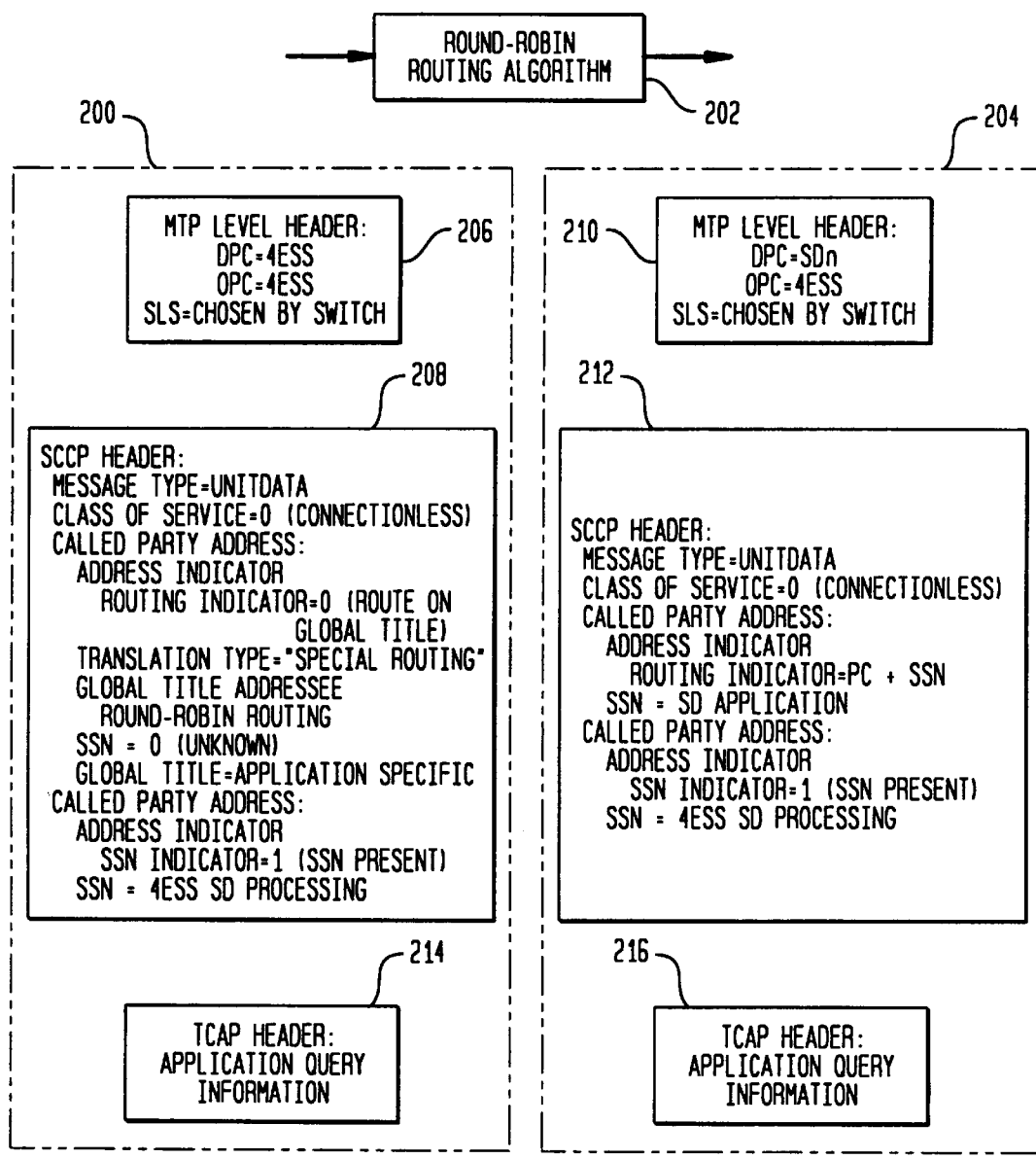
FIG. 2 is an illustrative embodiment of input and output of a round-robin routing engine of this invention.

FIG. 2 shows illustrative Input 200 and Output 204 of 4ESS switch 112, (FIG. 1) where Round-robin algorithm 202 of the present invention is implemented. As shown, the left column lists the headers of Input 200 entered into 4ESS switch 112 (FIG. 1) and the right column lists the headers of Output 204 generated from 4ESS switch 112 (FIG. 1). These headers are all part of the same message that has to be routed. The content of Input 200 and Output 204 may be categorized into at least the following types of headers: Message Transfer Part ("MTP") Header 206 and 210, Signaling Connection Control Part ("SCCP") Header 208 and 212, and Translation Capabilities Application Part ("TCAP") Header 214 and 216.

MTP Header 206 and 210 each may include, but not limited to, the following parameters: Destination Point Code ("DPC"), Originating Point Code ("OPC") and Signaling Link Selection ("SLS"). DPC is the address to which a message is to be sent. OPC indicates the source of the message so that the response to the query can be returned to the signaling point that originated the message. SLS is used to load-share signaling messages across a link set in the SS7 network. SCCP Header 208 and 212 each may include the following parameters: Message Type, Class of Service and Called Party Addresses. In a typical SS7 routing, there is a function called a Global Title translation which is used for a higher level routing of, for example, 800 queries. The Global Title translation is also used for a call that requires the round-robin routing of the present invention for even load-sharing. TCAP Header 214 and 216 each may include Application Query Information, that is a part of protocol for calling application. It conveys most of the application specific information from switch to database so that the database can respond to a query.

For example, an incoming call requiring a query to a database, needs to know the address to which to send the query. For a call that requires round-robin routing of the query, the DPC of such a call is set to 4ESS switch 112 (FIG. 1) itself. If the switch has the round-robin routing table, the 4ESS switch 112 (FIG. 1), then, looks at the Routing Indicator in the Called Party Address. The Routing Indicator may be set to point code routing or global title routing. If the call is related to a global title routing, then, 4ESS switch 112 (FIG. 1) looks into the Translation Type and Global Title Address of the Called Party Address. If the Translation Type and Global Title Address indicate round-robin routing, then 4ESS switch 112 (FIG. 1) determines that the round-robin routing algorithm 202 should be used and proceeds with Input 200 to do a lookup on the round-robin routing table which is discussed in reference to FIG. 3. The lookup provides Output 204 that includes the DPC pointing to a particular database. The database is denoted SD$_n$ that can be any of SD$_1$ 102, SD$_2$ 104 or SD$_3$ 106 (FIG. 1). The query is, thereafter, sent to the selected SD$_n$ by 4ESS switch 112 (FIG. 1). The database, SD$_n$, in return processes the query and sends the response to the query back to 4ESS switch 112 (FIG. 1).

FIG. 3 illustrates exemplary Round-robin routing table 300 that includes columns of Index numbers 302, Point Codes 304 and Subsystem Numbers 306. The index numbers range from 0 to n−1 and account for n replicated databases SD$_n$ in Network 100 (FIG. 1) available to an incoming query at 4ESS switch 112 (FIG. 1). The point codes provide key pieces of information directing to a corresponding database. Also, the subsystem numbers are provided since in each database, there may be multiple subsystems with different applications including, for example 800 service, private network service, etc.

Figure 4A:
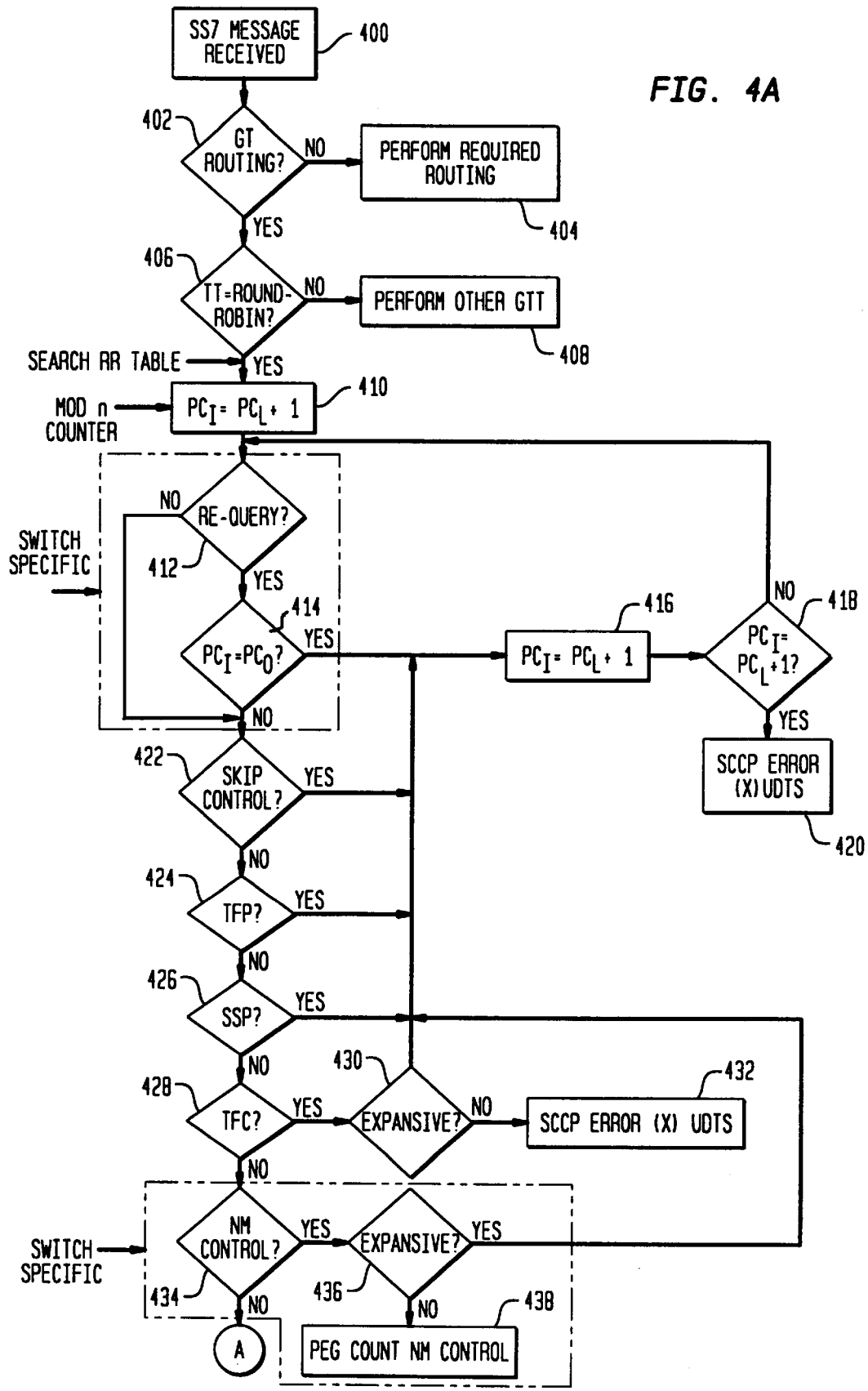
FIGS. 4a–b (collectively referred to as FIG. 4) is a flow chart of steps for carrying out an illustrative embodiment of this invention.
Figure 4B:
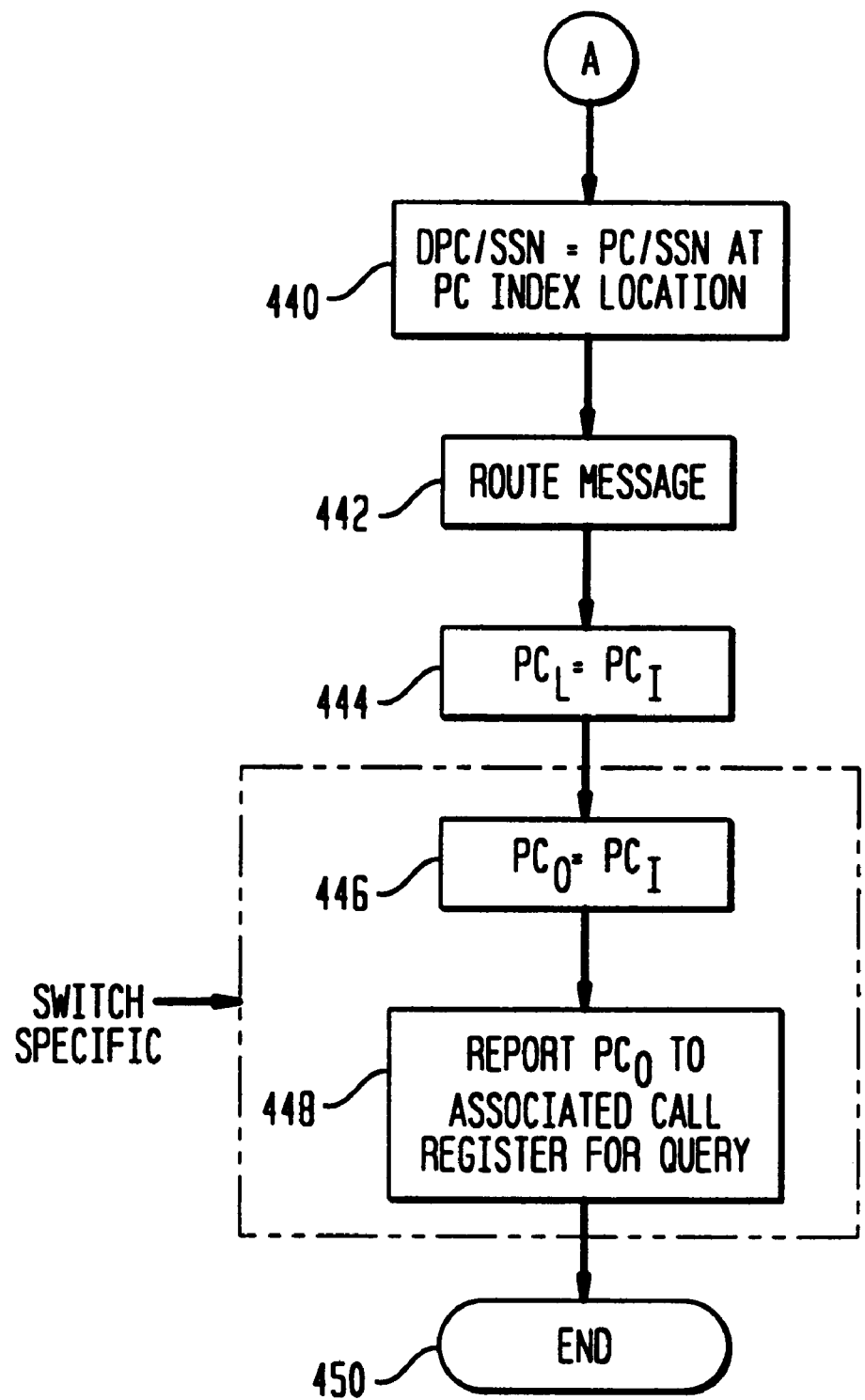

FIG. 4 is a flow chart having an illustrative sequence of steps in accordance with the preferred embodiment when the round-robin routing algorithm is implemented at 4ESS switch 112 (FIG. 1).

In step 400, 4ESS switch 112 (FIG. 1) receives an SS7 message for routing. This SS7 message is Input (FIG. 2) having MTP 206 (FIG. 2) and SCCP 208 (FIG. 2) information. From such information, 4ESS switch 112 (FIG. 1), in step 402, determines if the SS7 message requires a Global Title Translation, for example, required for the 800 service to translate an 800 number to an SS7 network address of the database that would perform the application to translate the 800 number to a conventional routing number. In order to determine the requirement of the Global Title translation, 4ESS switch 112 (FIG. 1) checks the routing indicator of SCCP Header 208 (FIG. 2). If the routing indicator is set to 1, the SS7 message does not require routing on the Global Title. If the SS7 message does not require the Global Title routing, then 4ESS switch 112 (FIG. 1) in step 404 performs point code routing that does not involve the round-robin algorithm.

On the other hand, if the routing indicator is set to 0, it requires routing on the Global Title. If the SS7 message requires the global title routing, then 4ESS switch 112 (FIG. 1) in step 406 determines if the Global Title translation requires the use of the round-robin routing algorithm by checking the Translation Type and Global Title Address in SCCP Header 208. If the Translation Type is set to other Global Title Translation such as a 800 service or private network service, 4ESS switch performs the specified routing in step 408. If the Translation Type and Global Title Address is set to round-robin routing, 4ESS switch 112 searches Round-robin table 300 (FIG. 3) as discussed in reference to FIG. 3. Thus, generally both the Translation Type and Global Title Address are used to determine round-robin routing.

The 4ESS switch 112 (FIG. 1) in step 410 utilizes modulus n counter such that n starts at zero and is incremented by one through to n−1, at which pointer n returns to zero on the next count. Each Index, n, points to data in the table containing the Point Code or MTP Destination Point Code ("DPC") and Subsystem Number or SCCP Subsystem Number ("SSN") addresses for the specific replicated database as shown in table 300 (FIG. 3).

More specifically, PC$_O$ represents a pointer to the last Point Code 304 (FIG. 3) and Subsystem Number 306 (FIG. 3) to which a query was sent for a call. This pointer PC$_O$, is used in case a re-query is required for this same call. A re-query would be required if no response was received for the initial query. PC$_O$ is used to ensure a re-query is not sent to the same database. PC$_I$ represents the current position of the pointer to index, n. PC$_L$ represents the pointer used for the previous query that required round-robin routing. The pointer PC$_1$ is incremented by one in step 410 so it would be set to the next count of PC$_L$.

In step 412, 4ESS switch 112 (FIG. 1) determines if this query is a repeat of the first query, for a specific call at the 4ESS. For example, if no response was received for the initial query of a call, a re-query will occur. If 4ESS switch 112 (FIG. 1) determines that the present query is a re-query, then 4ESS switch 112 (FIG. 1) checks in step 414 if $PC_I=PC_O$, i.e. if Point Code Index points to the original Point Code that was queried when the call first came into 4ESS switch 112 (FIG. 1). If it is determined that $PC_I=PC_O$, then 4ESS switch 112 in step 416 increments Index by one so that the query is directed to the next database.

In step 418, 4ESS switch 112 (FIG. 1) determines if $PC_I=PC_L+1$, i.e. if the pointer points to the database which was successfully queried by the previous query sent from switch. This checks whether the pointer ends up back where it started its query routing inquiry in table 300 (FIG. 3).

If the pointer points to where 4ESS switch 112 (FIG. 1) started its query sequence in table 300 (FIG. 3), then 4ESS switch 112 (FIG. 1) provides an error message in step 420. This error message is called an SCCP error. Otherwise, 4ESS switch 112 (FIG. 1) returns to step 412. If 4ESS switch 112 (FIG. 1) determines that the present query is not a re-query in step 412, 4ESS switch 112 in step 422 determines whether a function called skip control is activated. The skip control is a manual control that is used by a network manager to cause queries not to be sent to a particular address because of, for example, a maintenance problem detected in the database located at that particular address. If 4ESS switch 112 (FIG. 1) determines that the skip control is active, 4ESS switch 112 (FIG. 1) proceeds to step 416 to try the database at the next address by incrementing the counter. In step 418, 4ESS switch 112 (FIG. 1) determines whether the Point Code Index points to the original pointer value when the algorithm was entered. If it points to the same database again, 4ESS switch 112 (FIG. 1) prompts an error message in step 420. If the pointer does not point to the same database, 4ESS switch 112 (FIG. 1) loops back to step 412.

Otherwise, 4ESS switch 112 (FIG. 1) determines in step 424 if the SS7 route from 4ESS switch 112 (FIG. 1) to $SD_n$ (FIG. 1) is MTP route inaccessible. MTP route inaccessibility is represented in the algorithm as Transfer Prohibited ("TFP"). For example, STP 108 and STP 110 (FIG. 1) may send TFP message to 4ESS switch 112 (FIG. 1) so as to indicate inaccessibility to a particular database. If TFP message is received on all routes to the database, i.e. MTP route is inaccessible, 4ESS switch 112 (FIG. 1) proceeds to step 416 to increment the counter.

Otherwise, 4ESS switch (FIG. 1) in step 426 determines if the destination is Subsystem Prohibited ("SSP"), i.e. an SSP message has been received. SSP message indicates that there is a problem with a particular Subsystem Number, such as one SD among all SDs. If SSP message is received, 4ESS switch 112 (FIG. 1) proceeds to step 416 and increments the counter.

Otherwise, 4ESS switch 112 (FIG. 1) in step 428 determines if it is MTP route congested, referred to here as "TFC". If it is MTP route congested, 4ESS switch 112 (FIG. 1) determines in step 430 if a network control is in place to allow the 4ESS switch 112 to continue to search the round-robin table for available addresses, known as an "expansive control." If the expansive control is not active, no further search of the round-robin routing table is made in order to protect the network and an SCCP error message is sent to the originator of the query in step 432. Further, the query message is discarded and a relevant measurement is pegged.

If there is no MTP route congestion in step 428, 4ESS switch 112 (FIG. 1) in step 434 determines if a network application overload ("NM") control is in effect. If an NM control is in effect, 4ESS switch 112 (FIG. 1) determines in step 436 if an NM expansive control is in place for the NM control. If the expansive control is not in place then per step 438 the 4ESS switch 112 (FIG. 1) is notified of the action, a measurement is pegged and the query is discarded. If the expansive control is in effect, then 4ESS switch 112 continues the search on round-robin routing table in step 416.

If no NM control is in effect in step 434, 4ESS switch 112 (FIG. 1) in step 440 (FIG. 4b) uses the available address at the Pointer to populate the Message Transfer Part ("MTP") Destination Point Code ("DPC") and Signaling Connection Control Part ("SCCP") Called Party Address ("CdPA") Subsystem Number ("SSN"). In step 442, 4ESS switch 112 (FIG. 1) routes the message on the route determined by the MTP routing tables and the signaling link derived from the MTP SLS tables. In step 444, the index where the address found to route this query is set to $PC_L$. $PC_L$ is used for the next query that arrives at the 4ESS switch 112 (FIG. 1) that requires round-robin routing.

In step 446, $PC_O$ is set to the index at the Pointer, $PC_I$ so that the address at which $PC_I$ is presently set is not used in case a re-query is required. In step 448, the $PC_O$ is reported to the originating process that created the query. This report is stored with the call register for the call in case of a re-query.

The process ends in step 450.

The order of the steps in FIG. 4 is not critical. For example step 426 can occur earlier in the process (e.g., between steps 422 and 424).

Figure 5:
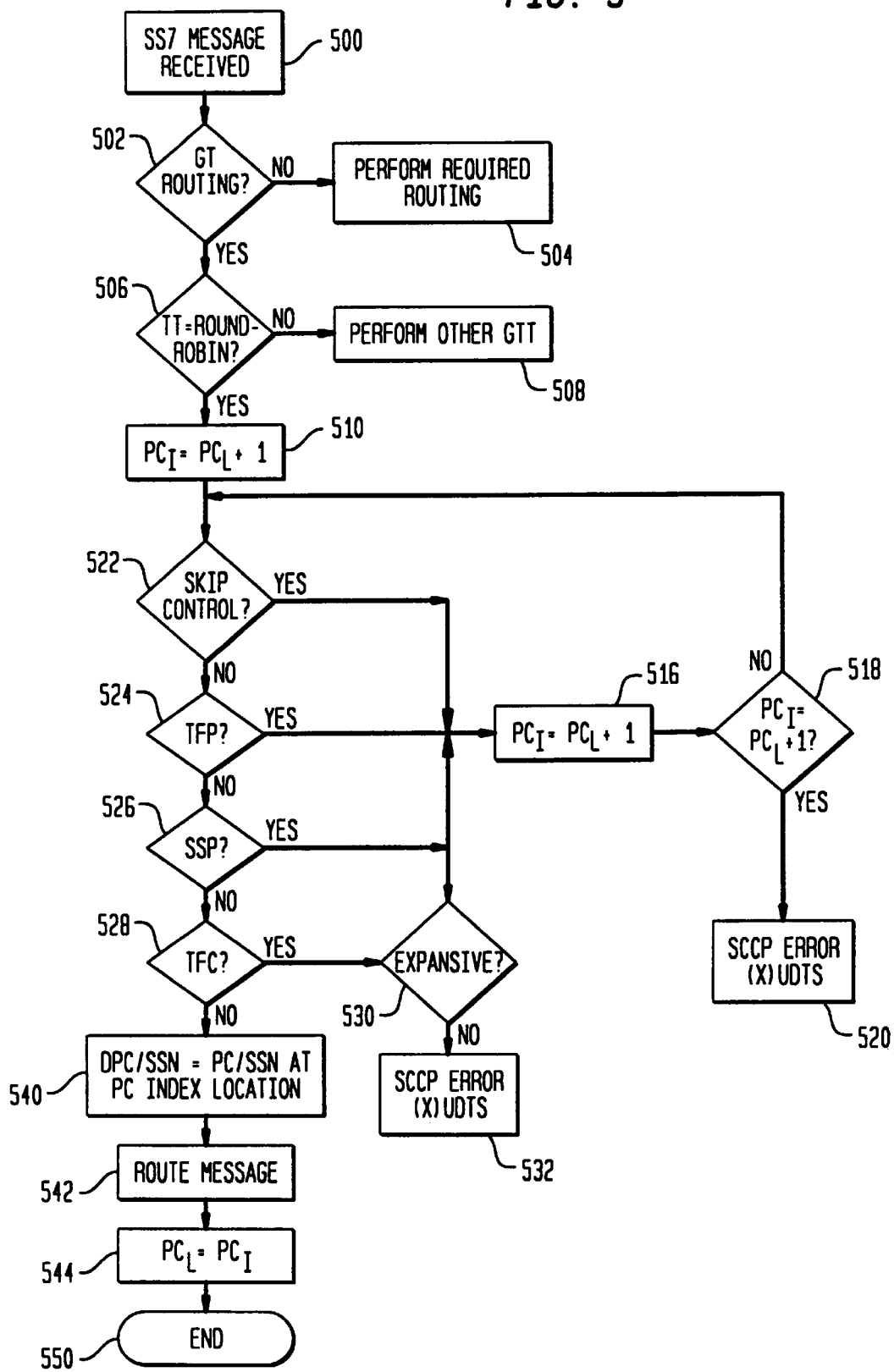
FIG. 5 is a flow chart of steps for carrying out another illustrative embodiment of this invention.

FIG. 5 shows adaptation of the method of FIG. 4 to an alternative embodiment utilizing an STP processor instead of 4ESS switch processor. Thus, the mated pair of STPs 108 and 110 (FIG. 1) process the round-robin routing algorithm 202 to evenly distribute queries among $SD_1$ 102, $SD_2$ 104 and $SD_3$ 106 (FIG. 1). Many of the steps in FIG. 5 are the same or similar to steps in FIG. 4, except the 4ESS switch 112 (FIG. 1) specific steps 412, 414, 434, 436, 438, 446 and 448 (which are enclosed in dotted rectangulars in FIG. 4). The correspondence of steps is indicated by use of the same last two reference number digits for the same or similar steps in FIGS. 4 and 5. Thus, the discussion of steps in FIG. 5 can be somewhat abbreviated because more extensive discussion has already been provided for corresponding steps in FIG. 4.

In step 500 (similar to step 400 in FIG. 4), STP 108 or 110 receives an SS7 message via 4ESS switch 112 (FIG. 1). $STP_1$ 108 or $STP_2$ 110 (FIG. 1) in step 512 determines if the SS7 message requires a global title translation. More header 208 (FIG. 2) of the SS7 message to determine the need for global title routing. If the routing indicator indicates that it does not require a global title routing, $STP_1$ 108 or $STP_2$ 110 (FIG. 1) in step 504 performs point code routing in the SS7 network.

If the routing indicator indicates the global title routing, $STP_1$ 108 or $STP_2$ 110 (FIG. 1) in step 506 determines if the round-robin routing is specified. $STP_1$ 108 or $STP_2$ 110 (FIG. 1) looks up the translation type and global title address in the SCCP header. If the translation type and global title address is set to any global title address translation types other than that requiring round-robin routing, then $STP_1$ 108 or $STP_2$ 110 in step 508 performs the specified global title translation.

If the translation type and global title address indicates round-robin routing is required, then $STP_1$ 108 or $STP_2$ 110 (FIG. 1) in step 510 increments the index number of the last successful query in the round-robin routing table 300 by one.

In step 522, $STP_1$ 108 or $STP_2$ 110 (FIG. 1) determines if the skip control function is in effect. If STP 108 or 110 determines that the skip control is turned on, $STP_1$ 108 or $STP_2$ 110 (FIG. 1) in step 516 increments the index number in Round-robin routing table 300 (FIG. 3) by one again so that the point code would point to the next available database.

In step 518, $STP_1$ 108 or $STP_2$ 110 (FIG. 1) confirms that the point code does not point to the same database that has been pointed after step 510 and already checked. If it is the same database that has been already checked, $STP_1$ 108 or $STP_2$ 110 (FIG. 1) in step 520 prompts an error message. Otherwise, $STP_1$ 108 or $STP_2$ 110 (FIG. 1) returns to step 522.

Remaining steps 524, 526, 528, 530, 532, 540, 542, 544 and 550 are respectively similar to corresponding steps in FIG. 4 and therefore do not need to be described again.

It will be understood that the foregoing is only illustrative of the principles of the invention and that various modifications can be made by those skilled in the art without departing from the scope and spirit of the invention. For example, to reiterate, some specific examples of possible uses of the invention include controlling access to computer systems, transaction processing systems, voice mail or voice response systems, and secured facilities such as buildings, prisons, military installations, and other high security locations. The invention may be employed only for certain users such as administrators or other super users.

The invention claimed is:

1. A method of providing an even loadsharing of round-robin querying of a plurality of replicated databases in a network architecture which responds to network conditions comprising the steps of:

creating a round-robin routing table including correlated index numbers, point codes and subsystem numbers of the replicated databases;

responding to incoming queries with searching of the round-robin routing table by incrementing to a successor index number; and querying the corresponding point code and sub-system number of an available database to set an address.

2. The method as defined in claim 1 further comprising the step of incrementing the index number if the database corresponding to the index number is a database that was previously queried as part of a same incoming call.

3. The method as defined in claim 1 further comprising the step of incrementing the index number if the database corresponding to the index number is overloaded.

4. The method as defined in claim 1 further comprising the step of incrementing the index number if a route congestion to the database corresponding to the index number is detected.

5. The method as defined in claim 1 further comprising the step of discarding the query if the database corresponding to the index number is inoperable and if a predetermined control action is to block the query.

6. The method as defined in claim 1 further comprising the step of reporting an error message if the index number is the same as a previous index number associated with a previous query for a last call that used the round-robin routing table.

7. The method as defined in claim 1 further comprising the step of incrementing the index number if a predetermined control action is to skip the database corresponding to the index number.

8. The method as defined in claim 1 further comprising the steps of prompting an error message and discarding the query if a predetermined control action is to discontinue searching of the round-robin routing table.

9. A method of distributing queries to a plurality of replicated databases in a network, the network having a signaling system that interconnects a system switch through at least one signaling transfer point with the plurality of replicated databases, the method comprising the steps of:

generating a round-robin control table for controlling query database destinations, the round-robin control table having a plurality of index numbers, point codes, and subsystem numbers, each of the plurality of point codes and the plurality of subsystem numbers being associated with at least one of the plurality of index numbers and with at least one of the plurality of replicated databases;

entering a first database query;

determining if controlled routing is required by the first database query;

selecting an address associated with a search index number if controlled routing is required by the first database query, the address comprising the point code and the subsystem number that are associated with the one of the plurality of index numbers, the plurality of index numbers including the search index number; and querying the point code and the subsystem number of a first replicated database at the address, the plurality of replicated databases including the first replicated database.

10. The method as defined in claim 9 wherein the selecting step comprises incrementing the search index number if the first replicated database is previously queried.

11. The method as defined in claim 9 further comprising the step of incrementing the search index number if a route to the first replicated database is congested.

12. The method as defined in claim 9 further comprising the step of incrementing the search index number if the first replicated database is inoperable.

13. A network for providing loadsharing using round-robin querying, the network comprising:

a plurality of replicated databases including a first replicated database;

a round-robin routing table having a plurality of index numbers including a first index number, point codes, and subsystem numbers, each of the plurality of point codes and the plurality of subsystem numbers being associated with at least one of the plurality of index numbers and with at least one of the plurality of replicated databases; and at least one translator node for responding to incoming queries by incrementing the first index number to generate a search index number wherein the search index number is associated with the first replicated database, incrementing the search index number if the first replicated database is previously queried, searching the round-robin routing table according to the search index number, and querying the point code and the subsystem number of the first replicated database to set an address.

14. The network as defined in claim 13 further comprising a network manager for setting up a skip control so that the at least one translator node increments the search index number if the first replicated database is subject to the skip control.

15. The network as defined in claim 13 wherein the at least one translator node is a signaling transfer point.

16. The network as defined in claim 13 wherein the at least one translator note is a switch.

* * * * *